United States Patent
Suzuki et al.

[11] Patent Number: 5,887,570
[45] Date of Patent: Mar. 30, 1999

[54] IGNITION TIMING CONTROL SYSTEM FOR INTERNAL COMBUSTION ENGINES

[75] Inventors: Norio Suzuki; Manabu Niki, both of Wako, Japan

[73] Assignee: Honda Giken Kogyo Kabushiki Kaisha, Tokyo, Japan

[21] Appl. No.: 917,597

[22] Filed: Aug. 26, 1997

[30] Foreign Application Priority Data

Aug. 29, 1996 [JP] Japan .................................. 8-245462

[51] Int. Cl.⁶ .................................................. F02P 5/15
[52] U.S. Cl. .......................................... 123/417; 701/102
[58] Field of Search .................................. 123/406, 417, 123/673; 701/102, 109

[56] References Cited

U.S. PATENT DOCUMENTS

| | | | |
|---|---|---|---|
| 5,148,791 | 9/1992 | Nagano et al. | 123/417 |
| 5,383,432 | 1/1995 | Cullen et al. | 123/417 X |
| 5,448,975 | 9/1995 | Sato | 123/417 |
| 5,732,689 | 3/1998 | Ohno et al. | 123/673 |
| 5,806,506 | 9/1998 | Kitamura et al. | 123/673 |

FOREIGN PATENT DOCUMENTS

| | | |
|---|---|---|
| 2-11842 | 1/1990 | Japan . |
| 3-20596 | 3/1991 | Japan . |

*Primary Examiner*—Tony M. Argenbright
*Attorney, Agent, or Firm*—Nikaido Marmelstein Murray & Oram, LLP

[57] ABSTRACT

There is provided an ignition timing control system for an internal combustion engine. An air-fuel ratio sensor is arranged in the exhaust system, for detecting the air-fuel ratio of exhaust gases emitted from a plurality of cylinders of the engine. The air-fuel ratio of a mixture supplied to each of the cylinders is estimated based on an output from the air-fuel ratio sensor, by using an observer for observing an internal operative state of the exhaust system based on a model representative of a behavior of the exhaust system. The ignition timing of the each cylinder of the engine is controlled based on the estimated air-fuel ratio of the mixture supplied to the each cylinder.

4 Claims, 12 Drawing Sheets

IGNITION TIMING CONTROL SYSTEM FOR INTERNAL COMBUSTION ENGINES

BACKGROUND OF THE INVENTION

1. Field of the Invention

This invention relates to an ignition timing control system for internal combustion engines, and more particularly to an ignition timing control system of this kind, which controls the ignition timing of the engine cylinder by cylinder.

2. Prior Art

Conventionally, there has been proposed, e.g. by Japanese Patent Publication (Kokoku) No. 3-20596, a method of detecting indicated mean effective pressure of each cylinder, determining a variation in the indicated mean effective pressure of each cylinder between operating cycles of the cylinder from the detected values of the indicated means effective pressure, and controlling the ignition timing of the cylinder based on the determined variation in the indicated mean effective pressure so as to reduce the combustion toughness of the engine.

The proposed method, however, requires the use of a combustion pressure sensor for each cylinder, resulting in a complicated construction of the whole ignition control system and an increased manufacturing cost.

SUMMARY OF THE INVENTION

It is an object of the invention to provide an ignition timing control system for an internal combustion engine, which is simplified in construction and low in manufacturing cost, but is capable of properly controlling the ignition timing of the engine cylinder by cylinder.

To attain the above object, the invention provides an ignition timing control system for an internal combustion engine having a plurality of cylinders, and an exhaust system, comprising:

air-fuel ratio-detecting means arranged in the exhaust system, for detecting an air-fuel ratio of exhaust gases emitted from the cylinders;

cylinder-by-cylinder air-fuel ratio-estimating means for estimating an air-fuel ratio of a mixture supplied to each of the cylinders, based on an output from the air-fuel ratio-detecting means, by using an observer for observing an internal operative state of the exhaust system based on a model representative of a behavior of the exhaust system; and ignition timing control means for controlling ignition timing of the each of the cylinders of the engine based on the air-fuel ratio of the mixture supplied to the each of the cylinders estimated by the cylinder-by-cylinder air-fuel ratio-estimating means.

Preferably, the ignition timing control means sets an ignition advance amount for the ignition timing of the each of the cylinders to a smaller value as the air-fuel ratio of the mixture supplied to the each of the cylinders is richer.

Preferably, the exhaust system has at least one confluent portion, the air-fuel ratio-detecting means being arranged at the confluent portion.

More preferably, the cylinder-by-cylinder air-fuel ratio-estimating means includes confluent portion air-fuel ratio-estimating means for estimating an air-fuel ratio of exhaust gases at the confluent portion of the exhaust system by using a delay parameter indicative of a response delay of the air-fuel ratio-detecting means, the cylinder-by-cylinder air-fuel ratio-estimating means estimating the air-fuel ratio of the mixture supplied to the each of the cylinders by using an output from the confluent portion air-fuel ratio-estimating means, the estimated air-fuel ratio of the mixture supplied to the each of the cylinders being subsequently used for estimating a value of the air-fuel ratio of exhaust gases at the confluent portion.

Further preferably, the cylinder-by-cylinder air-fuel ratio-estimating means estimates the air-fuel ratio of the mixture supplied to the each of the cylinders, based on a difference between the output from the air-fuel ratio-detecting means and the output from the confluent portion air-fuel ratio-estimating means.

More preferably, the observer of the cylinder-by-cylinder air-fuel ratio-estimating means observes an air-fuel ratio of an air-fuel mixture supplied to ones of the cylinders connected to the confluent portion of the exhaust system and the air-fuel ratio of exhaust gases at the confluent portion of the exhaust system.

The above and other objects, features, and advantages of the invention will become more apparent from the following detailed description taken in conjunction with the accompanying drawings.

DETAILED DESCRIPTION

The invention will now be described in detail with reference to the drawings showing an embodiment thereof.

Figure 1:
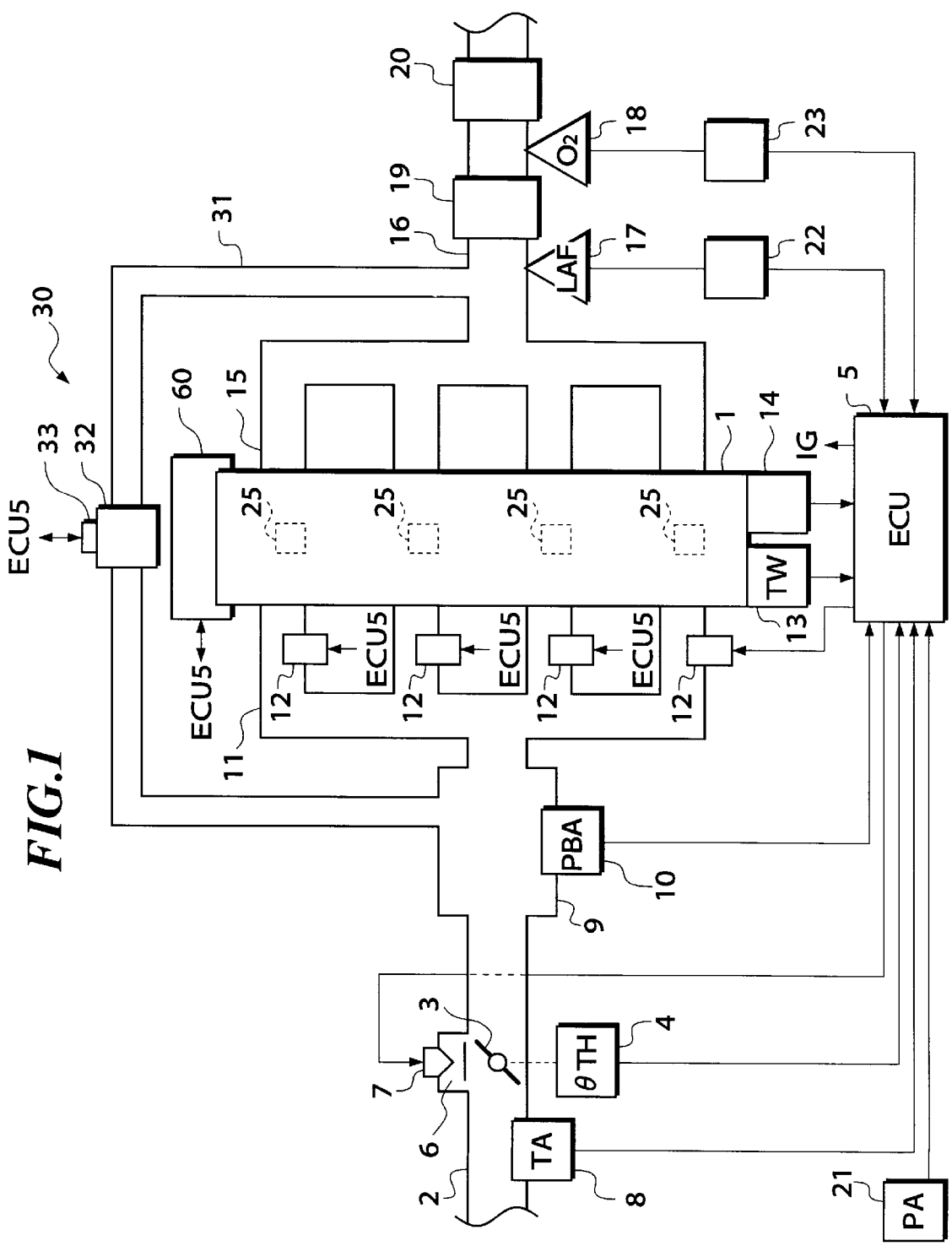
FIG. 1 is a block diagram showing the whole arrangement of an internal combustion engine incorporating a control system therefor which includes an ignition timing control system according to an embodiment of the invention.

Referring first to FIG. 1, there is shown the whole arrangement of an internal combustion engine (hereinafter simply referred to as "the engine") and a control system therefor which includes an ignition timing control system according to an embodiment of the invention. In the figure, reference numeral 1 designates a four-cylinder engine for automotive vehicles.

The engine 1 has an intake pipe 2 having a manifold part (intake manifold) 11 directly connected to the combustion chamber of each cylinder. A throttle valve 3 is arranged in the intake pipe 2 at a location upstream of the manifold part 11. A throttle valve opening (θTH) sensor 4 is connected to the throttle valve 3 for generating an electric signal indicative of the sensed throttle valve opening θ TH and supplying the same to an electronic control unit (hereinafter referred to as "the ECU") 5. The intake pipe 2 is provided with an auxiliary air passage 6 bypassing the throttle valve 3, and an auxiliary air amount control valve (electromagnetic valve) 7 is arranged in the auxiliary air passage 6. The auxiliary air amount control valve 7 is electrically connected to the ECU 5 to have an amount of opening thereof controlled by a signal therefrom.

An intake air temperature (TA) sensor 8 is inserted into the intake pipe 2 at a location upstream of the throttle valve 3 for supplying an electric signal indicative of the sensed intake air temperature TA to the ECU 5. The intake pipe 2 has a thickened portion 9 as a chamber interposed between the throttle valve 3 and the intake manifold 11. An intake pipe absolute pressure (PBA) sensor 10 is arranged in the chamber 9 for supplying an electric signal indicative of the sensed intake pipe absolute pressure PBA to the ECU 5.

An engine coolant temperature (TW) sensor 13, which may be formed of a thermistor or the like, is mounted in the cylinder block of the engine 1 filled with an engine coolant for supplying an electric signal indicative of the sensed engine coolant temperature TW to the ECU 5. A crank angle position sensor 14 for detecting the rotational angle of a crankshaft, not shown, of the engine 1 is electrically connected to the ECU 5 for supplying electric signals corresponding to the rotational angle of the crankshaft to the ECU 5. The crank angle position sensor 14 is comprised of a cylinder-discriminating sensor which generates a pulse (hereinafter referred to as "the CYL signal pulse") at a predetermined crank angle position of a particular cylinder of the engine 1 before a TDC position of the cylinder corresponding to the start of the intake stroke of the cylinder, a TDC sensor which generates a pulse (hereinafter referred to as "the TDC signal pulse") at a predetermined crank angle position of each cylinder a predetermined angle before the TDC position (whenever the crankshaft rotates through 180 degrees in the case of a four-cylinder engine), and a CRK sensor which generates a pulse (hereinafter referred to as "the CRK signal pulse") at each of predetermined crank angle positions whenever the crankshaft rotates through a predetermined angle (e.g. 30 degrees) smaller than the rotational angle interval of generation of the TDC signal pulse. The CYL signal pulse, the TDC signal pulse and the CRK signal pulse are supplied to the ECU 5. These signal pulses are used for timing control in carrying out operations of the control system for determining fuel injection timing, ignition timing, etc., as well as for detecting the engine rotational speed NE.

Fuel injection valves 12 for respective cylinders are inserted into the intake manifold 11 at locations slightly upstream of intake valves, not shown, of the respective cylinders. The fuel injection valves 12 are connected to a fuel pump, not shown, and electrically connected to the ECU 5 to have their valve opening periods (fuel injection periods) and fuel injection timing controlled by signals therefrom. The engine 1 has spark plugs 25 provided for respective cylinders and electrically connected to the ECU 5 to have ignition timing IGLOG thereof controlled by signals therefrom.

An exhaust pipe 16 of the engine has a manifold part (exhaust manifold) 15 directly connected to the combustion chambers of the cylinders of the engine 1. A linear output air-fuel ratio sensor (hereinafter referred to as "the LAF sensor") 17 is arranged in a confluent portion of the exhaust pipe 16 at a location immediately downstream of the exhaust manifold 15. Further, a first three-way catalyst (immediate downstream three-way catalyst) 19 and a second three-way catalyst (bed-downstream three-way catalyst) 20 are arranged in the confluent portion of the exhaust pipe 16 at locations downstream of the LAF sensor 17 for purifying noxious components such as HC, CO, and NOx. An oxygen concentration sensor (hereinafter referred to as "the O2 sensor") 18 is arranged between the three-way catalysts 19 and 20.

As the linear output air-fuel ratio sensor 17 is used a LAF sensor as disclosed e.g. by Japanese Laid-Open Patent Publication (Kokai) No. 2-11842 filed by the present assignee. The LAF sensor 17 has a wide range output characteristic that its output changes linearly to the concentration of oxygen in exhaust gases from the engine 1.

The LAF sensor 17 is electrically connected via a low-pass filter 22 to the ECU 5 for supplying the ECU 5 with an electric signal substantially proportional in value to the concentration of oxygen present in exhaust gases from the engine (i.e. the air-fuel ratio). The O2 sensor 18 has an output characteristic that output voltage thereof drastically changes when the air-fuel ratio of a mixture supplied to the engine changes across a stoichiometric air-fuel ratio to deliver a high level signal when the mixture is richer than the stoichiometric air-fuel ratio, and a low level signal when the mixture is leaner than the same. The O2 sensor 18 is electrically connected via a low-pass filter 23 to the ECU 5 for supplying the ECU 5 with the high or low level signal.

The engine 1 is also provided with an exhaust gas recirculation system (EGR system) 30 which is comprised of an exhaust gas recirculation passage 31 connecting between the chamber 9 of the intake pipe 2 and the exhaust pipe 16, an exhaust gas recirculation (EGR) control valve 32 arranged in the exhaust gas recirculation passage 31 for controlling the amount of recirculated exhaust gases, and a lift sensor 33 for detecting the opening of the EGR control valve 32 and supplying a signal indicative of the sensed opening of the EGR control valve 32 to the ECU 5. The EGR control valve 32 is formed by an electromagnetic valve having a solenoid which is electrically connected to the ECU 5 to have its valve opening linearly changed by a control signal from the ECU 5.

The engine 1 has a valve timing changeover mechanism 60 which changes valve timing of at least the intake valves of the intake valves and exhaust valves between a high-speed valve timing suitable for operation of the engine in a high rotational speed region and a low-speed valve timing suitable for operation of the engine in a low rotational speed region. The changeover of the valve timing includes not only timing of opening and closing of the valve but also changeover of the valve lift amount, and further, when the low speed valve timing is selected, one of the two intake valves is rendered inoperative, thereby ensuring stable combustion within the combustion chamber even when the air-fuel ratio of the mixture is controlled to a leaner value than a stoichiometric air-fuel ratio.

The valve timing changeover mechanism 60 carries out changeover of the valve timing by means of changeover of hydraulic pressure for operating the valve, and includes an electromagnetic valve and an oil pressure sensor, neither of which is shown, which cooperate to effect the changeover of the hydraulic pressure. A signal from the oil pressure sensor is supplied to the. ECU 5, and the ECU 5 controls the operation of the electromagnetic valve to effect changeover of the valve timing.

An atmospheric pressure (PA) sensor 21 is electrically connected to the ECU 5 for detecting atmospheric pressure PA, and supplying a signal indicative of the sensed atmospheric pressure PA to the ECU 5.

The ECU 5 is comprised of an output circuit having the functions of shaping the waveforms of input signals from various sensors, shifting the voltage levels of sensor output signals to a predetermined level, converting analog signals from analog-output sensors to digital signals, and so forth, a central processing unit (hereinafter referred to as "the CPU"), a memory device comprised of a ROM storing various operational programs which are executed by the CPU and various maps and tables, referred to hereinafter, and a RAM for storing results of calculations from the CPU, etc., and an output circuit which outputs driving signals to the fuel injection valves 12 and other electromagnetic valves, the spark plugs 25 of the cylinders, etc.

The ECU 5 operates in response to the above-mentioned signals from the sensors including the LAF sensor 17 and the O2 sensor 18 to determine various operating conditions in which the engine 1 is operating, such as an air-fuel ratio feedback control region in which the air-fuel ratio of the mixture supplied to the engine 1 is controlled in response to outputs from the LAF sensor 17 and the O2 sensor 18, and open-loop control regions other than the feedback control region, and calculates, based upon the determined operating conditions, the valve opening period or fuel injection period TOUT over which the fuel injection valves 12 are to be opened, by the use of the following equation (1) in synchronism with inputting of TDC signal pulses to the ECU 5, to deliver driving signals to the fuel injection valves 12, which are based on results of the calculation:

$$\text{TOUT} = \text{TIMF} \times \text{KTOTAL} \times \text{KCMDM} \times \text{KLAF} \times \text{KOBSV\#N} \quad (1)$$

The symbols of the equation (1) will be explained in the following description of FIG. 2.

Figure 2:
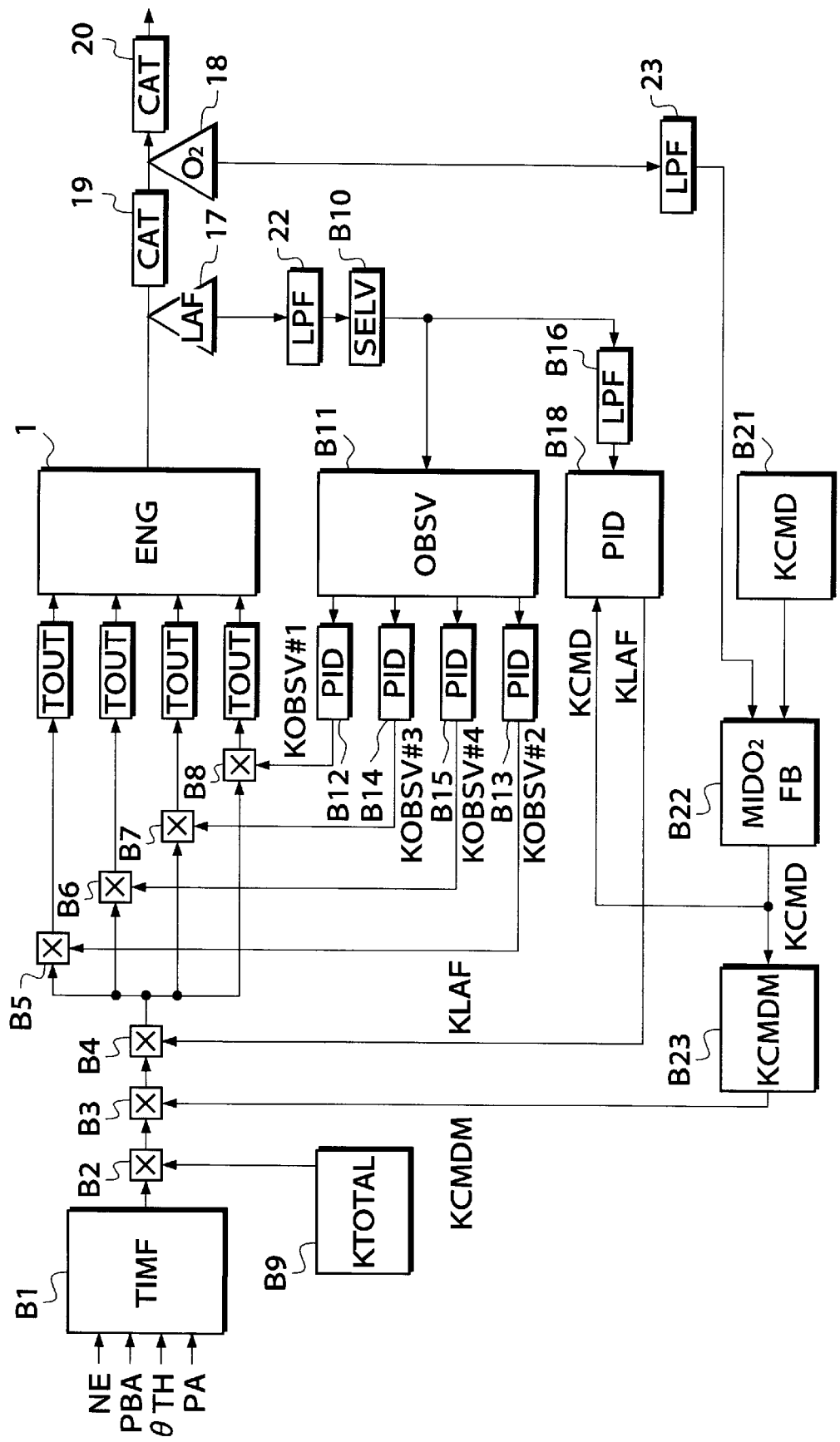
FIG. 2 is a block diagram useful in explaining the functions of the control system and a manner of controlling the air-fuel ratio of a mixture supplied to the engine.

FIG. 2 shows a block diagram which is useful in explaining a manner of calculation of the fuel injection period TOUT by the use of the equation (1). With reference to the figure, an outline of the manner of calculation of the fuel injection period TOUT according to the present embodiment will be described. It should be noted that in the present embodiment, the amount of fuel to be supplied to the engine is calculated, actually, in terms of a time period over which the fuel injection valve 6 is opened (fuel injection period), but in the present specification, the fuel injection period TOUT is referred to as the fuel injection amount or the fuel amount since the fuel injection period is equivalent to the amount of fuel injected or to be injected.

In FIG. 2, a block B1 calculates a basic fuel amount TIMF corresponding to an amount of intake air supplied to the engine. The basic fuel amount TIMF is basically set according to the engine rotational speed NE and the intake pipe absolute pressure PBA. However, it is preferred that a model representative of a part of the intake system extending from the throttle valve 3 to the combustion chambers of the engine 1 is prepared in advance, and a correction is made to the basic fuel amount TIMF in dependence on a delay of the flow of intake air obtained based on the model. In this preferred method, the throttle valve opening θTH and the atmospheric pressure PA are also used as additional parameters indicative of operating conditions of the engine.

Reference numerals B2 to B4 designate multiplying blocks, which multiply the basic fuel amount TIMF by respective parameter values input thereto, and deliver the product values. These blocks carry out the arithmetic operation of the equation (1), and provide fuel injection amounts TOUT(N) for the respective cylinders.

A block B9 multiplies together all feedforward correction coefficients, such as an engine coolant temperature-dependent correction coefficient KTW set according to the engine coolant temperature TW, an EGR-dependent correction coefficient KEGR set according to the amount of recirculation of exhaust gases during execution of exhaust gas recirculation, and a purge-dependent correction coefficient KPUG set according to an amount of purged fuel during execution of purging of evaporative fuel by an evaporative emission control system, not shown, to obtain a correction coefficient KTOTAL, which is supplied to the block B2.

A block B21 determines a desired air-fuel ratio coefficient KCMD based on the engine rotational speed NE, the intake pipe absolute pressure PBA, etc. and supplies the same to a block B22. The desired air-fuel ratio coefficient KCMD is directly proportional to the reciprocal of the air-fuel ratio A/F, i.e., the fuel-air ratio F/A, and assumes a value of 1.0 when it is equivalent to the stoichiometric air-fuel ratio. For this reason, this coefficient KCMD will be also referred to as the desired equivalent ratio. The block B22 corrects the desired air-fuel ratio coefficient KCMD based on the output VMO2 from the O2 sensor 18 supplied via the low-pass filter 23, and delivers the corrected KCMD value to a block B18 and the block B23. The block B23 carries out fuel cooling-dependent correction of the corrected KCMD value to calculate a final desired air-fuel ratio coefficient KCMDM and supplies the same to the block B3.

A block B10 samples the output from the LAF sensor 17 supplied via the low-pass filter 22 with a sampling period in synchronism with generation of each CRK signal pulse, sequentially stores the sampled values into a ring buffer memory, not shown, and selects one of the stored values depending on operating conditions of the engine (LAF sensor output-selecting processing), which was sampled at the optimum timing for each cylinder, to supply the selected value directly to a block B11 and to the block B18 via a corresponding low-pass filter block B16. The LAF sensor output-selecting processing eliminates the inconveniences that the air-fuel ratio, which changes every moment, cannot be accurately detected depending on the timing of sampling of the output from the LAF sensor 17, there is a time lag before exhaust gases emitted from the combustion chamber reach the LAF sensor 17, and the response time of the LAF sensor per se changes depending on operating conditions of the engine.

The block B11 has the function of a so-called observer, i.e. estimates a value of the air-fuel ratio separately for each cylinder from the air-fuel ratio detected at the confluent portion of the exhaust system (from a mixture of exhaust gases emitted from the cylinders) by the LAF sensor 17, and supplies the estimated value to a corresponding one of blocks B12 to B15 associated respectively, with the four cylinders. In FIG. 2, the block B12 corresponds to a cylinder #1, the block B13 to a cylinder #2, the block B14 to a cylinder #3, and the block B15 to a cylinder #4. The block B12 to B15 calculate a cylinder-by-cylinder correction coefficient KOBSV#N(N=1 to 4) by PID control such that the air-fuel ratio of each cylinder (the value of the air-fuel ratio estimated by the observer B11 for each cylinder) becomes equal to a value of the air-fuel ratio detected at the confluent portion, and supplies the calculated values to the blocks B5 to B8, respectively.

The block B18 calculates a PID correction coefficient KLAF by the PID control based on the difference between the actual air-fuel ratio and the desired air-fuel ratio, and supplies the calculated value to the block B4.

As described above, in the present embodiment, the fuel injection amount TOUT is calculated cylinder by cylinder by applying to the equation (1) the PID correction coefficient KLAF calculated by the PID control based on the output from the LAF sensor 17 and further the cylinder-by-cylinder correction coefficient KOBSV#N, which is set according to the air-fuel ratio value of each cylinder estimated based on the output from the LAF sensor 17. Variations in the air-fuel ratio between the cylinders can be eliminated by the use of the cylinder-by-cylinder correction coefficient KOBSV#N to thereby improve the purifying efficiency of the catalysts and hence achieve excellent exhaust emission characteristics of the engine in various operating conditions.

In the present embodiment, the functions of the blocks appearing in FIG. 2 are realized by arithmetic operations executed by the CPU of the ECU 5, and details of the operations will be described with reference to program routines illustrated in the drawings.

Figure 3:
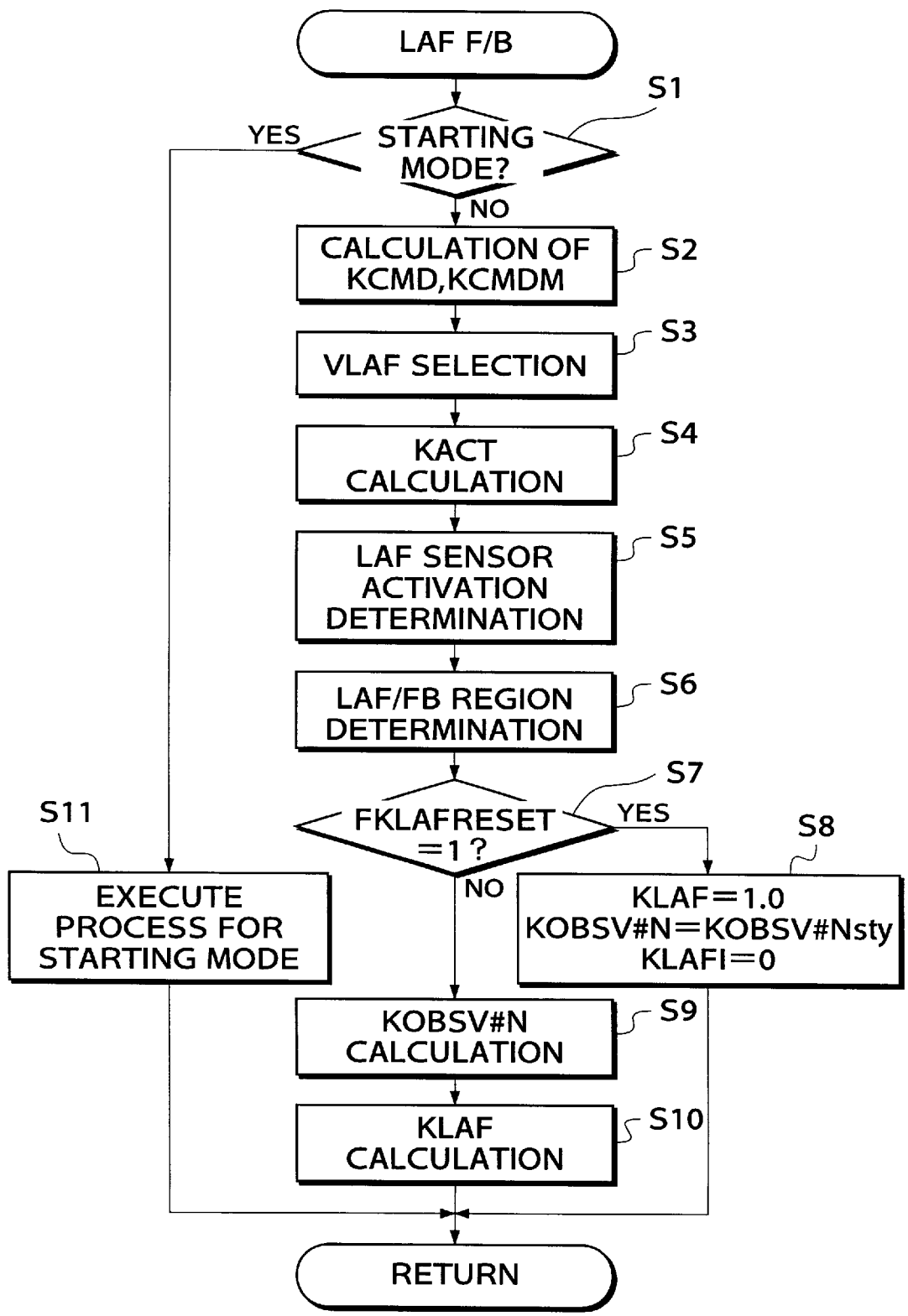
FIG. 3 is a flowchart showing a routine for calculating a PID correction coefficient KLAF and a cylinder-by-cylinder correction coefficient KOBSV#N in response to an output from a LAF sensor appearing in FIG. 1.

FIG. 3 shows a routine for calculating the PID correction coefficient KLAF and the cylinder-by-cylinder correction coefficient KOBSV#N based on the output from the LAF sensor 17. This routine is executed in synchronism with generation of each TDC signal pulse.

At a step S1, it is determined whether or not the engine is in a starting mode, i.e. whether or not the engine is being cranked. If the engine is in the starting mode, the program proceeds to a step S11 to execute a subroutine for the starting mode. If the engine is not in the starting mode, the desired air-fuel ratio coefficient (desired equivalent ratio) KCMD and the final desired air-fuel ratio coefficient KCMDM are calculated at a step S2, and the LAF sensor output-selecting process is executed at a step S3. Further, an actual equivalent ratio KACT is calculated at a step S4. The actual equivalent ratio KACT is obtained by converting the output from the LAF sensor 17 to an equivalent ratio value.

Then, it is determined at a step S5 whether or not the LAF sensor 17 has been activated. This determination is carried out by comparing the difference between the output voltage from the LAF sensor 17 and a central voltage thereof with a predetermined value (e.g. 0.4 V), and determining that the LAF sensor 17 has been activated when the difference is smaller than the predetermined value.

Then, it is determined at a step S6 whether or not the engine 1 is in an operating region in which the air-fuel ratio feedback control responsive to the output from the LAF sensor 17 is to be carried out (hereinafter referred to as "the LAF feedback control region"). More specifically, it is determined that the engine 1 is in the LAF feedback control region e.g. when the LAF sensor 17 has been activated but at the same time neither fuel cut nor wide open throttle operation is being carried out. If it is determined at this step that the engine is not in the LAF feedback control region, a reset flag FKLAFRESET, which, when set to "1", indicates that the feedback control based on the output from the LAF sensor 17 should be stopped, is set to "1", whereas if it is determined that the engine is in the LAF feedback control region, the reset flag FKLAFRESET is set to "0".

At the following step S7, it is determined whether or not the reset flag FKLAFRESET assumes "1". If FKLAFRESET=1 holds, the program proceeds to a step S8, wherein the PID correction coefficient KLAF is set to "1.0", the cylinder-by-cylinder correction coefficient KOBSV#N is set to a learned value KOBSV#Nsty thereof, referred to hereinafter, and an integral term KLAFI used in the PID control is set to "0", followed by terminating the program.

On the other hand, if FKLAFRESET=0 holds at the step S7, the cylinder-by-cylinder correction coefficient KOBSV#N and the PID correction coefficient KLAF are calculated at steps 9 and S10, respectively, followed by terminating the program.

Next, description will be made of a subroutine for calculating the cylinder-by-cylinder correction coefficient KOBSV#N, which is executed at the step S9 in FIG. 3.

First, a manner of estimation of the cylinder-by-cylinder air-fuel ratio by the observer will be described, and then a manner of calculating the cylinder-by-cylinder correction coefficient KOBSV#N based on the estimated cylinder-by-cylinder air-fuel ratio will be described.

The air-fuel ratio detected at the confluent portion of the exhaust system is regarded as a weighted average value of air-fuel ratio values of the cylinders, which reflects time-dependent contributions of all the cylinders, whereby values of the air-fuel ratio detected at time points (k), (k+1), (k+2) are expressed by equations (2A), (2B), and (2C), respectively. In preparing these equations, the fuel amount (F) was used as an operation amount, and accordingly the fuel-air ratio F/A is used in these equations:

$$[F/A](k) = C1[F/A\#1] + C2[F/A\#3] \quad (2A)$$
$$\qquad\qquad C3[F/A\#4] + C4[F/A\#2]$$

$$[F/A](k+1) = C1[F/A\#3] + C2[F/A\#4] \quad (2B)$$
$$\qquad\qquad C3[F/A\#2] + C4[F/A\#1]$$

$$[F/A](k+2) = C1[F/A\#4] + C2[F/A\#2] \quad (2C)$$
$$\qquad\qquad C3[F/A\#1] + C4[F/A\#3]$$

Figure 4:
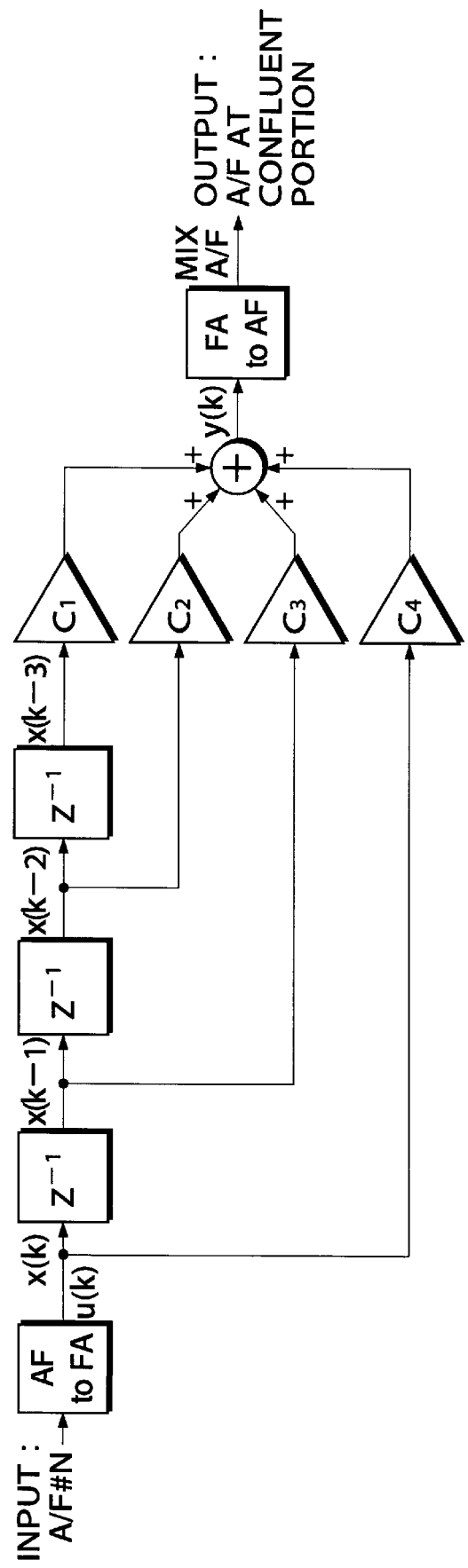
FIG. 4 is a block diagram showing a model representative of a behavior of the exhaust system of the engine.

More specifically, the fuel-air ratio detected at the confluent portion of the exhaust system is expressed as the sum of values of the cylinder-by-cylinder fuel-air ratio multiplied by respective weights C varying in the order of combustion (e.g. 40% for a cylinder corresponding to the immediately preceding combustion, 30% for one corresponding to the second preceding combustion, and so on). This model can be expressed in block diagrams as shown in FIG. 4, and the state equation therefor is expressed by the following equation (3):

$$\begin{bmatrix} x(k-2) \\ x(k-1) \\ x(k) \end{bmatrix} = \begin{bmatrix} 0 & 1 & 0 \\ 0 & 0 & 1 \\ 0 & 0 & 0 \end{bmatrix} \begin{bmatrix} x(k-3) \\ x(k-2) \\ x(k-1) \end{bmatrix} + \begin{bmatrix} 0 \\ 0 \\ 1 \end{bmatrix} u(k) \quad (3)$$

Further, if the fuel-air ratio detected at the confluent portion is designated by y(k), the output equation can be expressed by the following equation (4):

$$y(k) = [C_1 C_2 C_3] \begin{bmatrix} x(k-3) \\ x(k-2) \\ x(k-1) \end{bmatrix} + C_4 u(k) \quad (4)$$

where, $C1$: 0.05, $C2$: 0.15, $C3$: 0.30, $C4$: 0.05.

C1 to C4 in the figure are the weighting coefficients.

In the equation (4), u(k) cannot be observed, and hence an observer designed based on this state equation cannot enable observation of x(k). Therefore, on the assumption that a value of the air-fuel ratio detected four TDC signal pulses earlier (i.e. the immediately preceding value for the same cylinder) represents a value obtained under a steady operating condition of the engine without any drastic change in the air-fuel ratio, it is regarded that x(k+1)=x(k−3), whereby the equation (4) can be changed into the following equation (5):

$$\begin{bmatrix} x(k-2) \\ x(k-1) \\ x(k) \\ x(k+1) \end{bmatrix} = \begin{bmatrix} 0100 \\ 0010 \\ 0001 \\ 1000 \end{bmatrix} \begin{bmatrix} x(k-3) \\ x(k-2) \\ x(k-1) \\ x(k) \end{bmatrix} \quad (5)$$

$$y(k) = [C_1 C_2 C_3 C_4] \begin{bmatrix} x(k-3) \\ x(k-2) \\ x(k-1) \\ x(k) \end{bmatrix}$$

It was empirically ascertained that the above model accurately represents the exhaust system of a four-cylinder engine. Therefore, a problem arising from estimating the cylinder-by-cylinder air-fuel ratio from the air-fuel ratio A/F detected at the confluent portion of the exhaust system is the same as a problem with an ordinary Kalman filter used in observing x(k) by the following state equation and output equation (6). If weight matrices Q, R are expressed by the following equation (7), the Riccati's equation can be solved to obtain a gain matrix K represented by the following equation (8):

$$\begin{bmatrix} X(k+1) = AX(k) + Bu(k) \\ y(k) = CX(k) + Du(k) \end{bmatrix} \quad (6)$$

where $$A = \begin{bmatrix} 0100 \\ 0010 \\ 0001 \\ 1000 \end{bmatrix} \quad C = [C_1 C_2 C_3 C_4] B = D = [0]$$

$$X(k) = \begin{bmatrix} x(k-3) \\ x(k-2) \\ x(k-1) \\ x(k) \end{bmatrix}$$

$$Q = \begin{bmatrix} 1000 \\ 0100 \\ 0010 \\ 0001 \end{bmatrix} \quad R = [1] \quad (7)$$

$$K = \begin{bmatrix} -0.3093 \\ 1.1916 \\ 0.3093 \\ 0.0803 \end{bmatrix} \quad (8)$$

Figure 5:
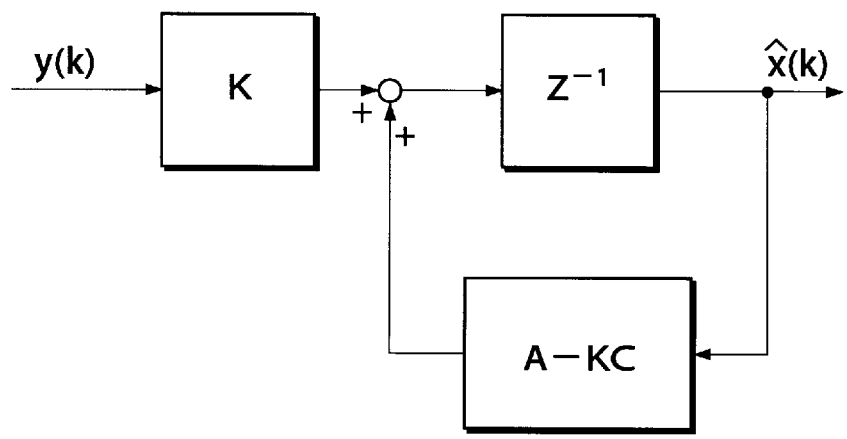
FIG. 5 is a block diagram showing the construction of an observer employed in the control system according to the embodiment.

In the model of the present embodiment, there is no inputting of u(k) which is input to an observer of a general type, so that the observer of the present embodiment is constructed such that y(k) alone is input thereto as shown in FIG. 5, which is expressed by the following equation (9):

$$\hat{X}(k+1) = [A - KC]\hat{X}(k) + Ky(k) \quad (9)$$
$$= A\hat{X}(k) + K(y(k) - C\hat{X}(k))$$

$$\hat{x}(k) = \begin{bmatrix} \hat{x}(k-3) \\ \hat{x}(k-2) \\ \hat{x}(k-1) \\ \hat{x}(k) \end{bmatrix}$$

Therefore, from the fuel-air ratio y(k) at the confluent portion and the estimated value $\hat{X}(k)$ of the cylinder-by-cylinder fuel-air ratio obtained in the past, the estimated value $\hat{X}(k+1)$ of the same in the present loop can be calculated.

When the estimated value $\hat{X}(k+1)$ of the cylinder-by-cylinder fuel-air ratio is calculated by the use of the above equation (9), the actual equivalent ratio KACT(k) is used as the fuel-air ratio y(k) at the confluent portion. This actual equivalent ratio KACT(k) contains the response delay of the LAF sensor 17, whereas $C\hat{X}(k)$ (i.e. the sum of the four cylinder-by-cylinder fuel-air ratio values multiplied by respective weights) does not contain the same. Therefore, the equation (9) cannot enable accurate estimation of the cylinder-by-cylinder fuel-air ratio, due to the response delay of the LAF sensor 17. Particularly, when the engine rotational speed is high, where time intervals of generation of TDC signal pulses are shorter, the response delay of the LAF sensor has a larger adverse effect on the estimation of the cylinder-by-cylinder fuel-air ratio.

Therefore, in the present embodiment, an estimated value $\hat{y}(k)$ of the fuel-air ratio at the confluent portion of the engine is calculated by the use of the following equation (10), and then the thus calculated value y(k) is applied to the following equation (11) to thereby obtain the estimated value $\hat{X}(k+1)$ of the cylinder-by-cylinder fuel-air ratio:

$$\hat{y}(k) = DL\hat{y}(k-1) + (1 - DL)C\hat{X}(k) \quad (10)$$

$$\hat{X}(k+1) = A\hat{X}(k) + K(y(k) - \hat{y}(k)) \quad (11)$$

In the above equation (10), DL represents a parameter corresponding to a time constant of the response delay of the LAF sensor 17. In the equations (10) and (11), the estimated value $\hat{X}(k)$ has an initial vector thereof set such that component elements thereof, i.e $\hat{X}(k-3)$, $\hat{X}(k-2)$, $\hat{X}(k-1)$, $\hat{X}(k)$ are all equal to "1.0", and in the equation (10), an initial value of $\hat{y}(k-1)$ is set to "1.0".

By the use of the equation (11) in which, as described above, the $C\hat{X}(k)$ of the equation (9) is replaced by the estimated value $\hat{y}(k)$ of the fuel-air ratio at the confluent portion which contains the response delay of the LAF sensor, it is possible to properly compensate for the response delay of the LAF sensor and hence estimate the value of the cylinder-by-cylinder air-fuel ratio with accuracy. It should be noted that in the following description each of estimated equivalent ratios KACT#1(k) to KACT#4(k) for the respective cylinders corresponds to $\hat{X}(k)$.

Figure 6:
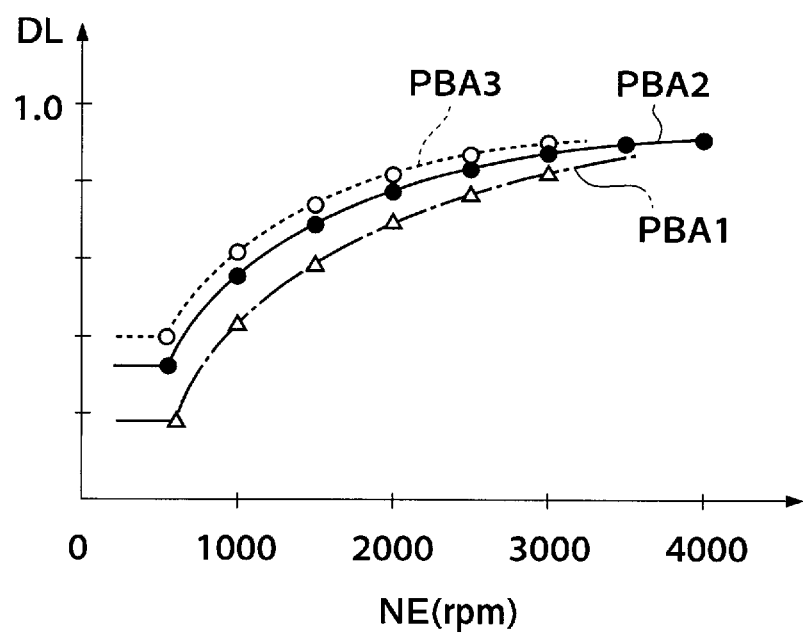
FIG. 6 shows a table for determining a time constant (DL) of response delay of the LAF sensor.

In the present embodiment, the DL value is calculated by the use of a DL table shown in FIG. 6. In the figure, PBA1 to PBA3 represent e.g. 660 mmHg, 460 mmHg, 260 mmHg, respectively, and the DL value is determined according to the detected engine rotational speed NE and intake pipe absolute pressure PBA and additionally by interpolation if required. It has been empirically ascertained that the best compensation for the response delay of the LAF sensor 17 can be obtained if the DL value is set to a value corresponding to a time period which is approximately 20% longer than the actual response delay time period.

Figure 7:
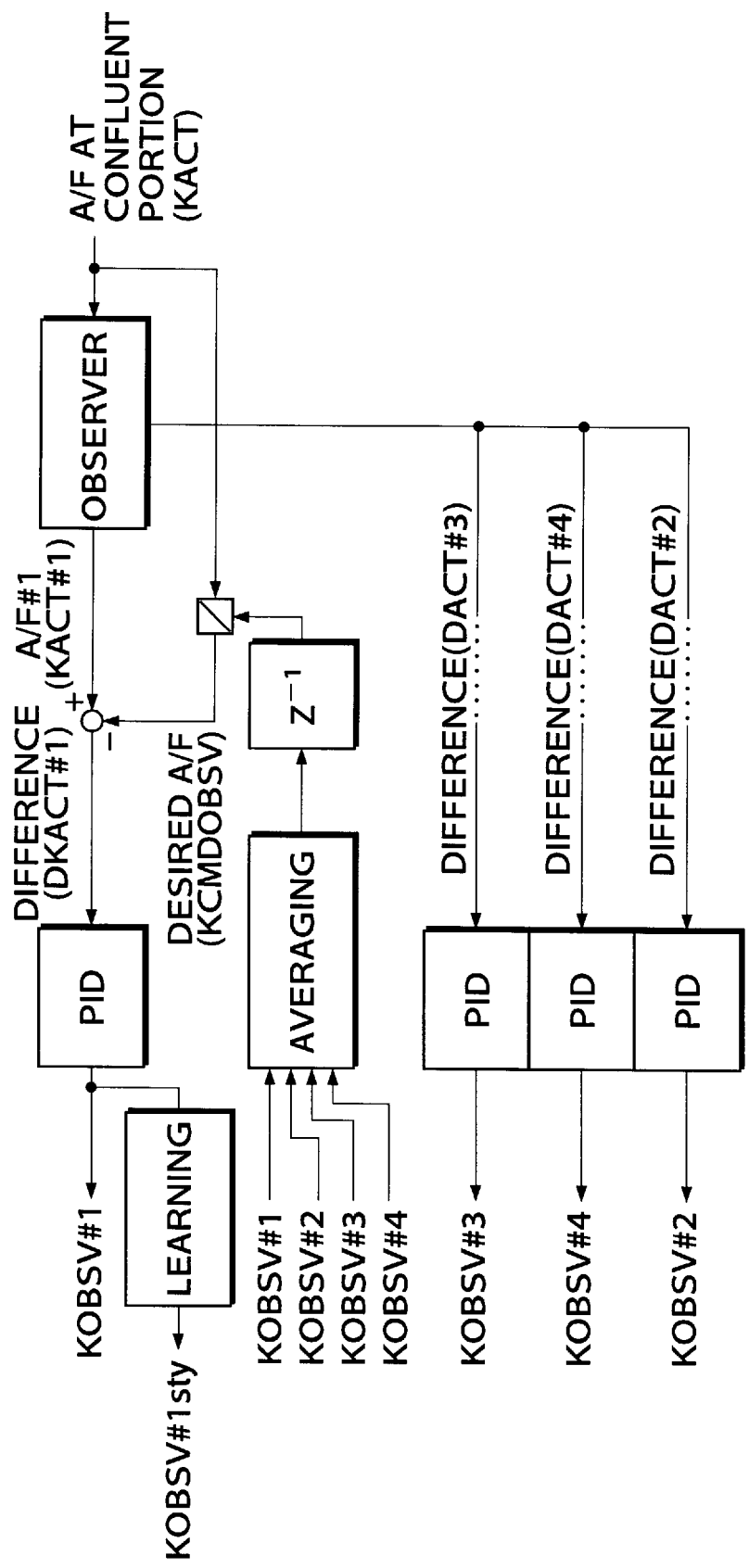
FIG. 7 is a block diagram useful in explaining how the air-fuel ratio feedback control is carried out cylinder by cylinder.

Next, a manner of calculating the cylinder-by-cylinder correction coefficient KOBSV#N based on the thus estimated cylinder-by-cylinder air-fuel ratio will be described with reference to FIG. 7.

First, as shown in equation (12), a desired value KCMDOBSV(k) as an equivalent ratio corresponding to the desired air-fuel ratio A/F is calculated by dividing the actual equivalent ratio KACT corresponding to the air-fuel ratio A/F at the confluent portion by the immediately preceding value of an average value of the cylinder-by-cylinder correction coefficient KOBSV#N for all the cylinders. The cylinder-by-cylinder correction coefficient KOBSV#1 for the #1 cylinder is calculated by the PID control such that the difference DKACT#1 (k) (=KACT#1 (k)−KCMDOBSV(k)) between the desired value KCMDOBSV(k) and the cylinder-by-cylinder equivalent ratio KACT#1 estimated for the #1 cylinder becomes equal to zero.

$$KCMDOBSV(k) = KACT(k) / \left( \sum_{N=1}^{4} KOBSV\#N(k-1)/4 \right) \quad (12)$$

More specifically, a proportional term KOBSVP#1, an integral term KOBSVI#1, and a differential term KOBSVD#1 are calculated by the use of the following equations (13A), (13B) and (13C). Then, the cylinder-by-cylinder correction coefficient KOBSV#1 for the #1 cylinder is calculated by the use of the following equation (14):

$$KOBSVP\#1(k) = KPOBSV \times DKACT\#1(k) \quad (13A)$$

$$KOBSVI\#1(k) = KIOBSV \times DKACT\#1(k) + KOBSVI\#1(k-1) \quad (13B)$$

$$KOBSVD\#1(k) = KDOBSV \times (DKACT\#1(k) - DKACT\#1(k-1)) \quad (13C)$$

$$KOBSV\#1(k) = \quad (14)$$

$$KOBSVP\#1(k) + KOBSVI\#1(k) + KOBSVD\#1(k) + 1.0$$

where KPOBSV, KIOBSV and KDOBSV represent a basic proportional term, a basic integral term, and a basic differential term, respectively.

Similar calculations are carried out for the other cylinders #2 to #4 to obtain cylinder-by-cylinder correction coefficient values KOBSV#2 to #4.

By this control operation, the air-fuel ratio of the mixture supplied to each cylinder is converged to the air-fuel ratio detected at the confluent portion of the exhaust system. Since the air-fuel ratio at the confluent portion is converged to the desired air-fuel ratio by the use of the PID correction coefficient KLAF, the air-fuel ratio values of mixtures supplied to all the cylinders can be eventually converged to the desired air-fuel ratio.

Further, the learned value KOBSV#Nsty of the cylinder-by-cylinder correction coefficient KOBSV#N is calculated for each operating region of the engine by the use of the following equation (15) and stored in the RAM backed up by a battery:

$$KOBSV\#Nsty = Csty \times KOBSV\#N + (1 - Csty) \times KOBSV\#Nsty \quad (15)$$

where Csty represents a weighting coefficient, and KOBSV#Nsty on the right side of the equation the immediately preceding learned value.

Figure 8:
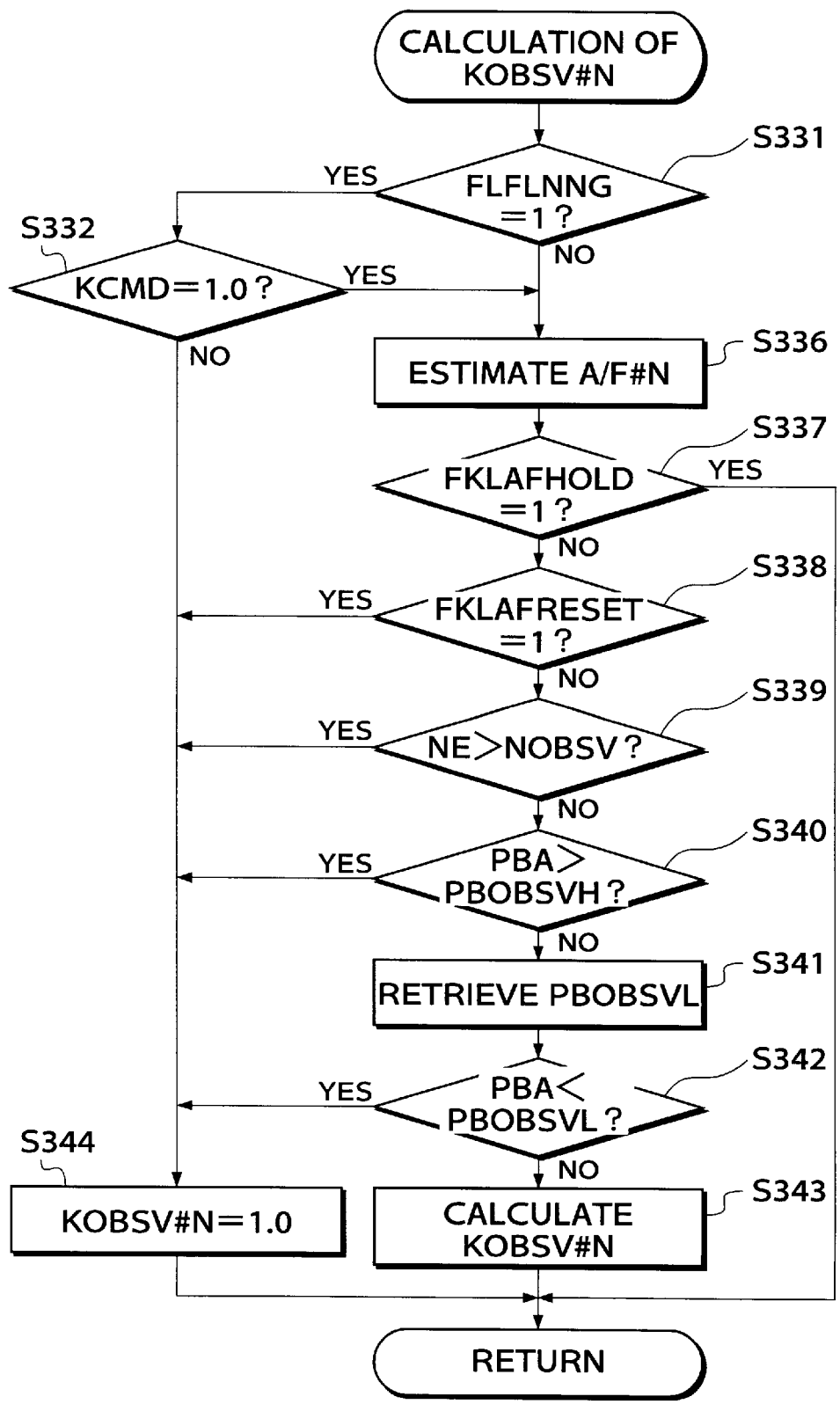
FIG. 8 is a flowchart showing a subroutine for calculating the cylinder-by-cylinder correction coefficient KOBSV#N, which is executed at a step S9 in FIG. 3.

FIG. 8 shows the subroutine for calculating the cylinder-by-cylinder correction coefficient KOBSV#N, which is executed at the step S9 in FIG. 3.

First, it is determined at a step S331 whether or not lean output deterioration of the LAF sensor 17 has been detected. If the lean output deterioration has not been detected, the program jumps to a step S336, whereas if the lean output deterioration has been detected, it is determined at a step S332 whether or not the desired air-fuel ratio KCMD is equal to 1.0, i.e. whether or not the desired air-fuel ratio is equal to the stoichiometric air-fuel ratio. The lean output deterioration of the LAF sensor means that the output from the LAF sensor exhibited when the air-fuel ratio of the mixture is actually controlled to a value leaner than the stoichiometric air-fuel ratio deviates from a proper value to a degree beyond a predetermined limit. If KCMD=1.0 holds at the step S332, the program proceeds to the step S336, whereas if KCMD≠1.0 holds, the cylinder-by-cylinder correction coefficient KOBSV#N for all the cylinders is set to 1.0 at a step S344, to inhibit execution of the cylinder-by-cylinder air-fuel ratio feedback control, followed by terminating the program. It should be noted that when abnormality of the intake air temperature sensor 8, the crank angle sensor 14, the EGR control valve 32 or the lift sensor 33 is detected, or when a disconnection of a heater, not shown, of the LAF sensor 17 or the like is detected, or further when a degraded response of the LAF sensor 17 is detected, the program may proceed, similarly to the above, to the step S344 to inhibit the cylinder-by-cylinder estimation of the air-fuel ratio (KACT) and cylinder-by-cylinder calculation of the air-fuel ratio correction coefficient (KLAF).

At the step S336, the air-fuel ratio is estimated cylinder by cylinder by the observer described above, and then it is determined at a step S337 whether or not a hold flag FKLAFHOLD, which, when set to "1", indicates that the PID correction coefficient should be held at the present value, assumes "1". If FKLAFHOLD=1 holds at the step S337, the present program is immediately terminated.

Figure 10:
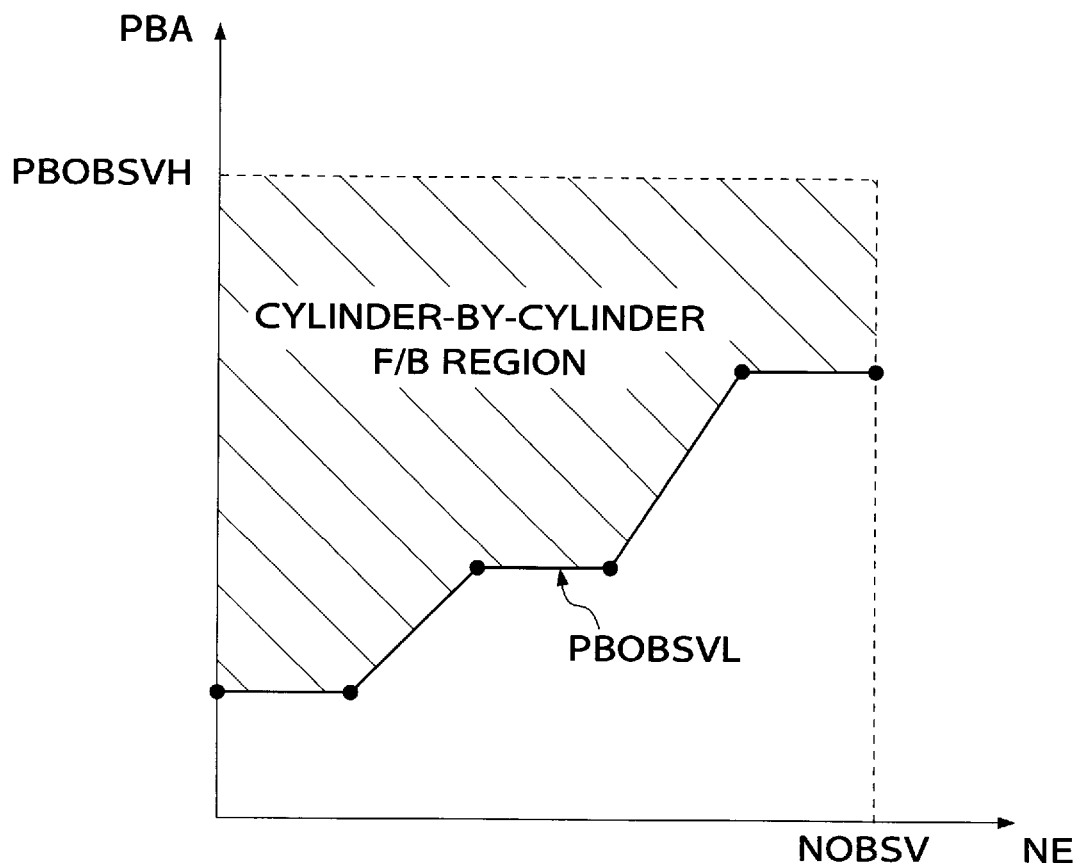
FIG. 10 is a diagram which is useful in explaining a cylinder-by-cylinder feedback control region.

If FKLAFHOLD=0 holds at the step S337, it is determined at a step S338 whether or not the reset flag FKLAFRESET assumes "1". If FKLAFRESET=0 holds at the step S338, it is determined at a step S339 whether or not the engine rotational speed NE is higher than a predetermined value NOBSV (e.g. 3500 rpm). If NE≦NOBSV holds at the step S339, it is determined at a step S340 whether or not the intake pipe absolute pressure PBA is higher than a predetermined upper limit value PBOBSVH (e.g. 650 mmHg). If PBA≦PBOBSVH holds at the step S340, a PBOBSVL table shown in FIG. 10 is retrieved according to the engine rotational speed NE to determine a lower limit value PBOBSVL of the intake pipe absolute pressure at a step S341, and it is determined at a step S342 whether or not the intake pipe absolute pressure PBA is lower than the determined lower limit value PBOBSVL.

If any of the answers to the questions of the steps S338 to S340, and S342 is affirmative (YES), the program proceeds to the step S344. In this case, the cylinder-by-cylinder air-fuel ratio feedback control is not carried out. On the other hand, if all the answers to the questions of the steps S338 to S340 and S342 are negative (NO), it is judged that the engine is in an operating region corresponding to a hatched area in FIG. 10, which means that the cylinder-by-cylinder air-fuel ratio feedback control can be carried out, so that the cylinder-by-cylinder correction coefficient KOBSV#N and the learned value KOBSV#Nsty thereof are calculated in the above described manner at a step S343, followed by terminating the program.

Figure 9:
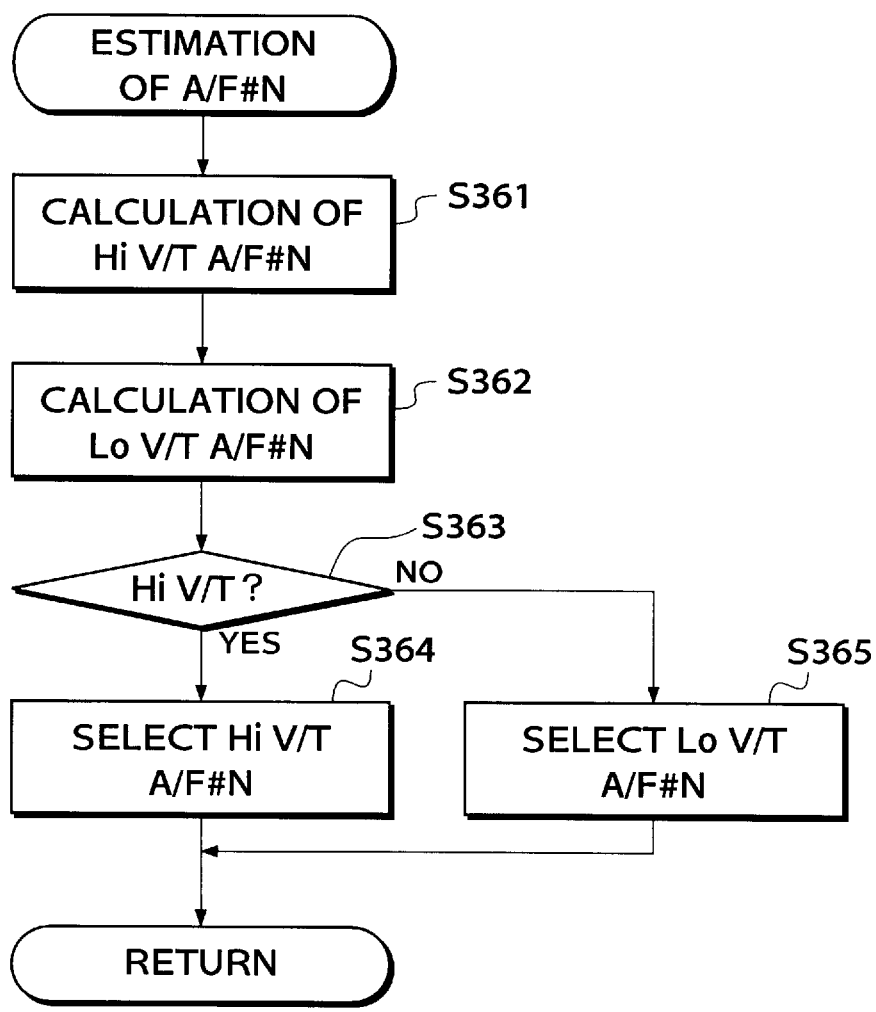
FIG. 9 is a flowchart showing a subroutine for estimating a cylinder-by-cylinder air-fuel ratio (KACT#N), which is executed at a step S336 in FIG. 8.

FIG. 9 shows a subroutine for estimating the cylinder-by-cylinder air-fuel ratio, which is executed at the step S336 in FIG. 8.

First, at a step S361, an arithmetic operation by the use of the observer (i.e. estimation of the cylinder-by-cylinder air-fuel ratio value) for the high-speed valve timing is carried out, and at the following step S362, an arithmetic calculation by the use of the observer for the low-speed valve timing is carried out. Then, it is determined at a step S363 whether or not the present valve timing is set to the high-speed valve timing. If the present valve timing is set to the high-speed valve timing, a result of the observer arithmetic operation for the high-speed valve timing is selected at a step S364, whereas if the present valve timing is set to the low-speed valve timing, a result of the observer arithmetic operation for the low-speed valve timing is selected at a step S365.

The reason why the observer arithmetic operations for the high-speed valve timing and the low-speed valve timing are thus carried out before determining the present valve timing is that the estimation of the cylinder-by-cylinder air-fuel ratio requires several times of arithmetic operations before the estimation results are converged. By the above manner of estimation, it is possible to enhance the accuracy of estimation of the cylinder-by-cylinder air-fuel ratio immediately after changeover of the valve timing.

Figure 11:
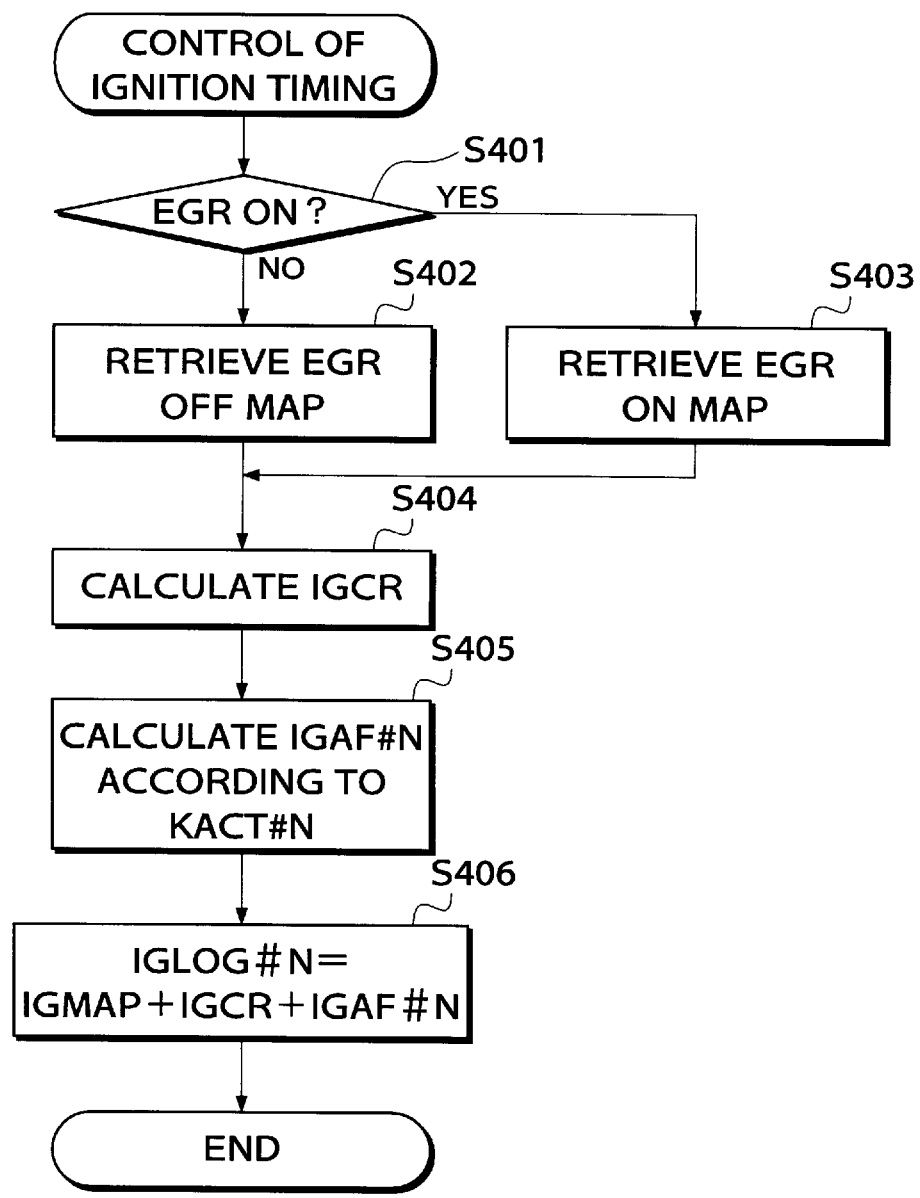
FIG. 11 is a flowchart showing a routine for carrying out an ignition timing control process.

FIG. 11 shows a routine for an ignition timing control process which is executed by the CPU of the ECU 5 in synchronism with generation of each TDC signal pulse.

First, it is determined at a step S401 whether or not exhaust gas recirculation (EGR) control is being executed (hereinafter a state of the EGR control being executed will be described as "the EGR is ON" whereas a state of the EGR control being not executed as "the EGR is OFF"). If it is determined that the EGR is OFF, an EGR OFF map is retrieved to determine a map value IGMAP of the ignition timing at a step S402, whereas if it is determined that the EGR is ON, an EGR ON map is retrieved to determine the map value IGMAP of the ignition timing at a step S403, followed in both cases by the program proceeding to a step S404. The EGR OFF map and EGR ON map are set such that predetermined values of the ignition timing (ignition advance amount) IGMAP are provided in a manner corresponding, respectively, to predetermined values of the engine rotational speed NE and predetermined values of the intake air absolute pressure PBA. The map values of the EGR ON map are set to suitable values for use when the EGR is ON, whereas the map values of the EGR OFF are set to suitable values for use when the EGR is OFF.

Figure 12A:
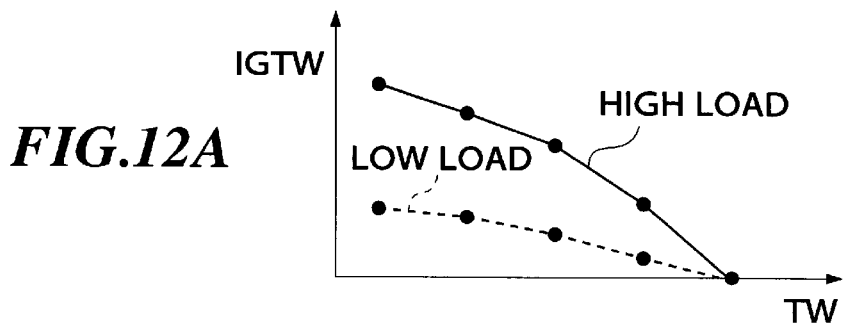
FIGS. 12A to 12D are diagrams showing tables used in the FIG. 11 routine.
Figure 12B:
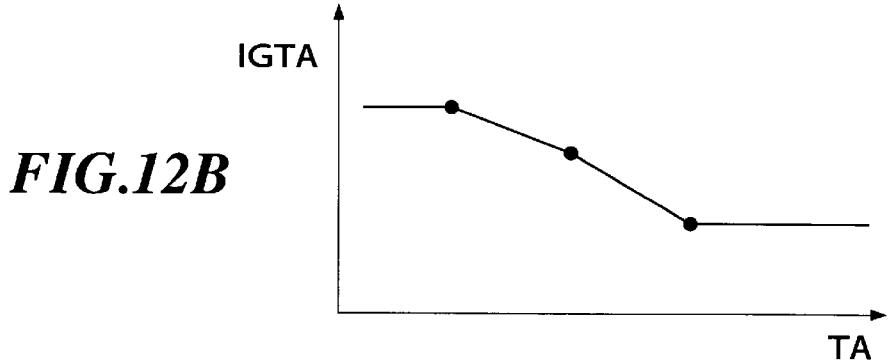
Figure 12C:
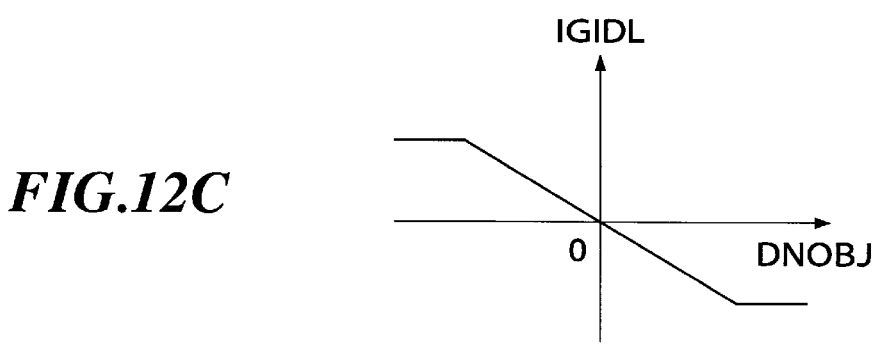
Figure 12D:
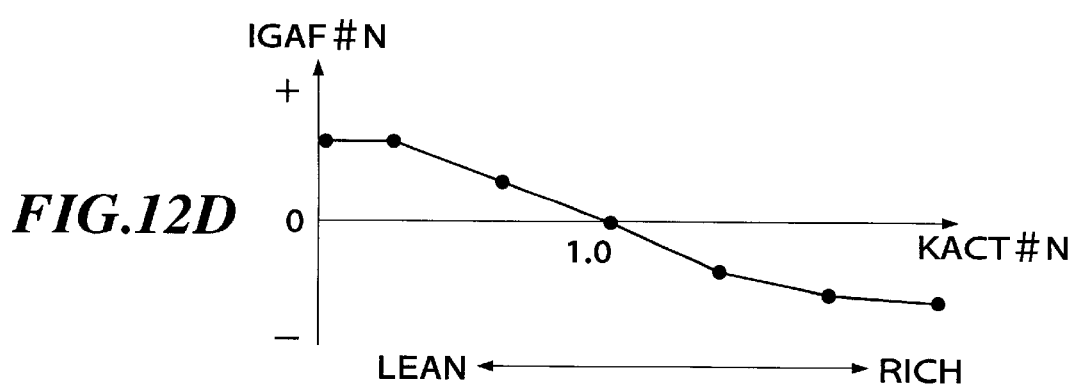

At a step S404, an ignition timing correction amount IGCR is calculated by the use of the following equation (16):

$$IGCR = IGTW + IGIDL + IGPS - IGTA \quad (16)$$

where IGTW represents an engine coolant temperature-dependent correction coefficient which is determined by retrieving an IGTW map shown in FIG. 12A according to the engine coolant temperature TW and load on the engine (i.e. the intake pipe absolute pressure PBA), IGIDL an idling-dependent correction coefficient which is determined by retrieving an IGIDL table shown in FIG. 12C according to the difference DNOBJ (=NE—NOBJ) between the engine rotational speed NE and a desired idling rotational speed NOBJ, IGPS a power steering-dependent correction coefficient which is set to a predetermined value (>0) when a power steering system, not shown, of the vehicle is in operation, and to "0" when the same is not in operation, and IGTA an intake air temperature-dependent correction coefficient which is determined by retrieving an IGTA table shown in FIG. 12B according to the intake air temperature TA.

At the following step S405, a cylinder-by-cylinder correction amount IGAF#N (N=1–4) for each cylinder is determined by retrieving an IGAF#N table according to the estimated cylinder-by-cylinder equivalent ratio KACT#N (N=1–4). The IGAF#N table is set such that the IGAF#N value assumes a smaller value as the actual cylinder-by-cylinder equivalent ratio KACT#N increases, i.e. the air-fuel ratio is richer.

Then, the map value IGMAP, the ignition timing correction amount IGCR, and the cylinder-by-cylinder correction amount IGAF#N are applied to the following equation (17) to calculate cylinder-by-cylinder ignition timing, i.e. ignition timing IGLOG#N for each cylinder at a step S406, followed by terminating the program:

$$IGLOG\#N = IGMAP + IGCR + IGAF\#N \quad (17)$$

The ignition timing of each cylinder is controlled according to the ignition timing IGLOG#N calculated by the ignition timing control process of FIG. 11 described above.

As described heretofore, according to the present embodiment, the cylinder-by-cylinder correction amount IGAF#N for the ignition timing is calculated according to the estimated cylinder-by-cylinder equivalent ratio KACT#N for each cylinder obtained by using the observer, to thereby correct the map value IGMAP. As a result, it is possible to properly control the ignition timing for each cylinder in a manner suitable to operating characteristics of the cylinder, without using a combustion pressure sensor for each cylinder.

What is claimed is:

1. An ignition timing control system for an internal combustion engine having a plurality of cylinders, and an exhaust system, comprising:

air-fuel ratio-detecting means arranged in said exhaust system, for detecting an air-fuel ratio of exhaust gases emitted from said cylinders, wherein said exhaust system has at least one confluent portion, said air-fuel ratio-detecting means being arranged at said confluent portion;

cylinder-by-cylinder air-fuel ratio-estimating means for estimating an air-fuel ratio of a mixture supplied to each of said cylinders, based on an output from said air-fuel ratio-detecting means, by using an observer for observing an internal operative state of said exhaust system based on a model representative of a behavior of said exhaust system, wherein said cylinder-by-cylinder air-fuel ratio-estimating means includes confluent portion air-fuel ratio-estimating means for estimating an air-fuel ratio of exhaust gases at said confluent portion of said exhaust system by using a delay parameter indicative of a response delay of said air-fuel ratio-detecting means, said cylinder-by-cylinder air-fuel ratio-estimating means estimating said air-fuel ratio of said mixture supplied to said each of said cylinders by using an output from said confluent portion air-fuel ratio-estimating means, said estimated air-fuel ratio of said mixture supplied to said each of said cylinders being subsequently used for estimating a value of said air-fuel ratio of exhaust gases at said confluent portion; and ignition timing control means for controlling ignition timing of said each of said cylinders of said engine based on said air-fuel ratio of said mixture supplied to said each of said cylinders estimated by said cylinder-by-cylinder air-fuel ratio-estimating means.

2. An ignition timing control system according to claim 1, wherein said ignition timing control means sets an ignition advance amount for said ignition timing of said each of said cylinders to a smaller value as said air-fuel ratio of said mixture supplied to said each of said cylinders is richer.

3. An ignition timing control system according to claim 1, wherein said cylinder-by-cylinder air-fuel ratio-estimating means estimates said air-fuel ratio of said mixture supplied to said each of said cylinders, based on a difference between said output from said air-fuel ratio-detecting means and said output from said confluent portion air-fuel ratio-estimating means.

4. An ignition timing control system according to claim 1, wherein said observer of said cylinder-by-cylinder air-fuel ratio-estimating means observes an air-fuel ratio of an air-fuel mixture supplied to ones of said cylinders connected to said confluent portion of said exhaust system and said air-fuel ratio of exhaust gases at said confluent portion of said exhaust system.

* * * * *